(12) United States Patent  
Akamine (10) Patent No.: US 9,871,938 B2  
(45) Date of Patent: Jan. 16, 2018

(54) IMAGE PROCESSING APPARATUS, COMMUNICATION APPARATUS, IMAGE PROCESSING SYSTEM, AND IMAGE PROCESSING METHOD

(71) Applicant: FUJI XEROX CO., LTD., Tokyo (JP)

(72) Inventor: Ryo Akamine, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 121 days.

(21) Appl. No.: 14/604,864

(22) Filed: Jan. 26, 2015

(65) Prior Publication Data

US 2016/0004495 A1 Jan. 7, 2016

(30) Foreign Application Priority Data

Jul. 4, 2014 (JP) ................................. 2014-138281

(51) Int. Cl.  
*H04N 1/00* (2006.01)

(52) U.S. Cl.  
CPC . *H04N 1/00912* (2013.01); *H04N 2201/0012* (2013.01)

(58) Field of Classification Search  
CPC ................... H04N 1/00912; H04N 2201/0012  
USPC .................................... 358/1.13, 1.15, 1.16  
See application file for complete search history.

(56) References Cited

U.S. PATENT DOCUMENTS

2013/0229673 A1* 9/2013 Nakayama ......... H04N 1/00127  
    358/1.13  
2013/0229687 A1* 9/2013 Yamauchi ............. G06F 3/1204  
    358/1.15

FOREIGN PATENT DOCUMENTS

JP 2008-061117 A 3/2008

* cited by examiner

*Primary Examiner* — Kent Yip  
(74) *Attorney, Agent, or Firm* — Sughrue Mion, PLLC (57) ABSTRACT

An image processing apparatus includes a communication unit and a controller. The communication unit receives first identification information via wireless communication from a terminal that has received the first identification information. The first identification information indicates a first storage location for image information in another apparatus. A controller transmits the image information to the first storage location indicated by the first identification information in a case where the communication unit has received the first identification information from the terminal.

8 Claims, 7 Drawing Sheets

IMAGE PROCESSING APPARATUS, COMMUNICATION APPARATUS, IMAGE PROCESSING SYSTEM, AND IMAGE PROCESSING METHOD

CROSS-REFERENCE TO RELATED APPLICATIONS

This application is based on and claims priority under 35 USC 119 from Japanese Patent Application No. 2014-138281 filed Jul. 4, 2014.

BACKGROUND

Technical Field

The present invention relates to an image processing apparatus, a communication apparatus, an image processing system, and an image processing method.

SUMMARY

According to an aspect of the invention, there is provided an image processing apparatus including a communication unit and a controller. The communication unit receives first identification information via wireless communication from a terminal that has received the first identification information. The first identification information indicates a first storage location for image information in another apparatus. A controller transmits the image information to the first storage location indicated by the first identification information in a case where the communication unit has received the first identification information from the terminal.

BRIEF DESCRIPTION OF THE DRAWINGS

An exemplary embodiment of the present invention will be described in detail based on the following figures, wherein.

DETAILED DESCRIPTION

An exemplary embodiment of the present invention will be described in detail below with reference to the accompanying drawings.

System Configuration

Figure 1:
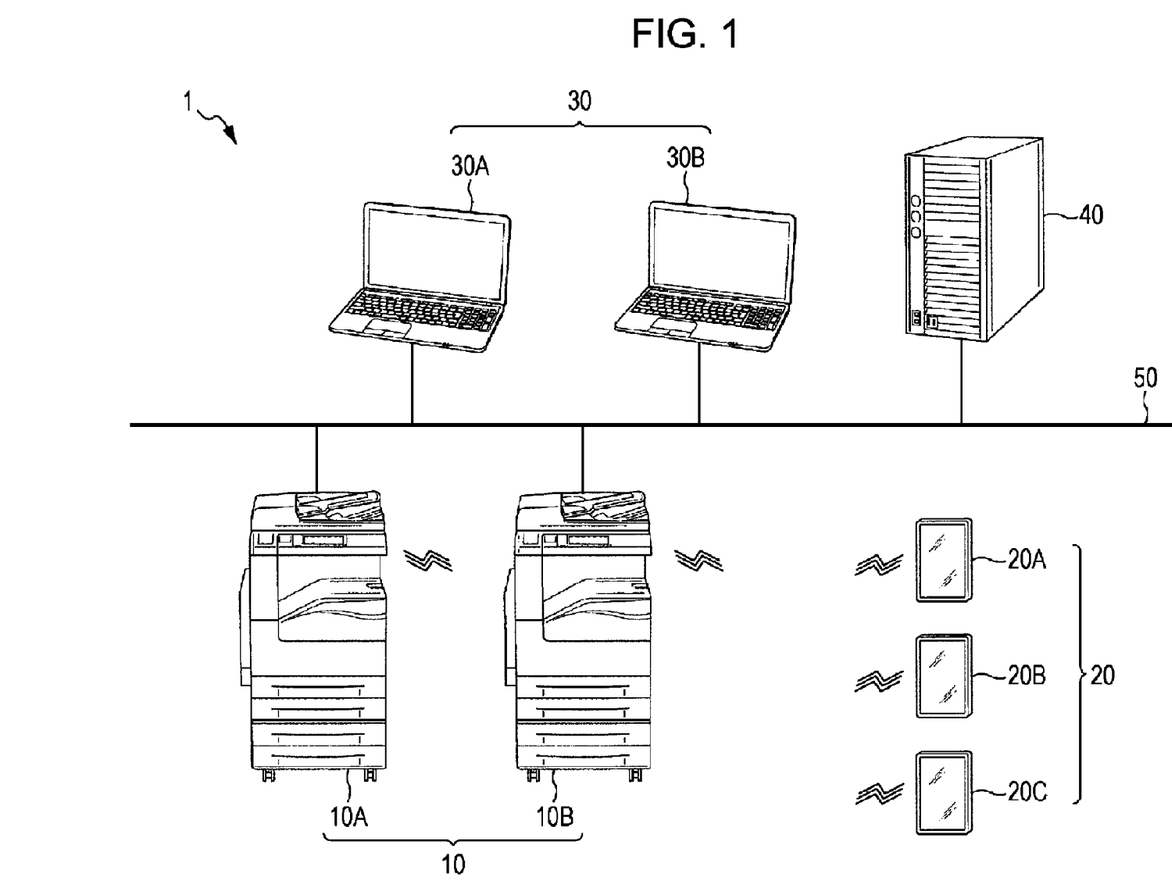
FIG. 1 illustrates an example of an overall configuration of an image processing system according to an exemplary embodiment of the present invention.

An overall configuration of an image processing system 1 according to an exemplary embodiment will be described. FIG. 1 illustrates an example of an overall configuration of the image processing system 1 according to the present exemplary embodiment. As illustrated in FIG. 1, the image processing system 1 includes an image processing apparatus 10A, an image processing apparatus 10B, a mobile terminal 20A, a mobile terminal 20B, a mobile terminal 20C, an operation terminal 30A, an operation terminal 30B, and a management server 40. Wireless communication is performed among the image processing apparatus 10A, the image processing apparatus 10B, the mobile terminal 20A, the mobile terminal 20B, and the mobile terminal 20C. In addition, the image processing apparatus 10A, the image processing apparatus 10B, the operation terminal 30A, the operation terminal 30B, and the management server 40 are connected to a network 50 and perform communication with one another via the network 50.

The image processing apparatuses 10A and 10B are illustrated in FIG. 1; however, the image processing apparatuses 10A and 10B are referred to as image processing apparatuses 10 if distinction between them is not required. Likewise, the mobile terminals 20A, 20B, and 20C are illustrated in FIG. 1; however, the mobile terminals 20A, 20B, and 20C are referred to as mobile terminals 20 if distinction between them is not required. Further, the operation terminals 30A and 30B are illustrated in FIG. 1; however, the operation terminals 30A and 30B are referred to as operation terminals 30 if distinction between them is not required. Two image processing apparatuses 10 are provided in the example illustrated in FIG. 1; however, three or more image processing apparatuses 10 may be provided. Further, three mobile terminals 20 are provided in the example illustrated in FIG. 1; however, four or more mobile terminals 20 may be provided. In addition, two operation terminals 30 are provided in the example illustrated in FIG. 1; however, three or more operation terminals 30 may be provided.

Each of the image processing apparatuses 10 is, for example, an apparatus having functions such as a scan function, a print function, a copy function, and a facsimile function, and forms an image on a recording medium such as paper and outputs the resulting recording medium. Each of the image processing apparatuses 10 receives a print job from the mobile terminals 20 and the operation terminals 30 and executes a printing process in accordance with the print job that has been received. A print job includes image data to be printed and a control instruction that describes settings used in the printing process, and is data that serves as a unit of a printing process executed by the image processing apparatus 10.

Each of the mobile terminals 20 is a mobile computer apparatus used when an instruction to execute various functions is given to the image processing apparatuses 10. For example, a device such as a smartphone, a tablet personal computer (PC), or a notebook PC may be used as the mobile terminal 20.

Each of the operation terminals 30, which is an example of a communication apparatus, is a computer apparatus used by a user to view and edit a document file. For example, a device such as a notebook PC or a desktop PC may be used as the operation terminal 30. In addition, a mobile computer apparatus such as a smartphone may also be used.

The management server 40 is a computer apparatus that stores various kinds of data processed by the image processing system 1.

The network 50 is a communication medium used for communication of information among apparatuses such as the image processing apparatuses 10, the operation terminals 30, and the management server 40. The network 50 is, for example, a wired local area network (LAN).

In the present exemplary embodiment, short-range wireless communication (e.g., near field communication (NFC)) and wireless communication based on another communication standard (e.g., Wi-Fi Direct) that achieves a speed higher than that achieved with the short-range wireless communication are performed between the image processing apparatuses 10 and the mobile terminals 20. NFC is a wireless communication standard in which a communication range is limited to approximately ten centimeters. In addition, Wi-Fi Direct is a standard that enables direct communication between Wi-Fi terminals. According to Wi-Fi Direct, each Wi-Fi device has a function for operating as an access point. An access point is a relay device that wirelessly relays communication between devices. Specifically, according to Wi-Fi Direct, one of plural Wi-Fi devices that participate in a network substantially operates as an access point and direct communication is performed between the device serving as the access point and the other Wi-Fi devices.

According to Wi-Fi Direct, each communication apparatus that participates in a certain network is defined as a peer-to-peer (P2P) device and the network is defined as a P2P group. A P2P device that substantially operates as an access point in a P2P group is defined as a P2P group owner. P2P devices other than the P2P group owner are defined as P2P clients. Each P2P device exchanges a signal with another P2P device to detect a P2P device that serves as a candidate of the Wi-Fi Direct connection destination. In this way, the P2P group owner is selected from among plural P2P devices.

In the present exemplary embodiment, a description will be given on the assumption that the image processing apparatuses 10 serve as the P2P group owners. In addition, according to Wi-Fi Direct, an upper limit is generally decided for the number of P2P clients that are allowed to connect to the P2P group owner at one time. In the present exemplary embodiment, it is assumed that the upper limit for the number of mobile terminals 20 that are allowed to connect to each of the image processing apparatuses 10 using Wi-Fi Direct at one time (hereinafter, referred to as the number of simultaneous connections) is three.

Hardware Configuration of Image Processing Apparatus 10

Figure 2:
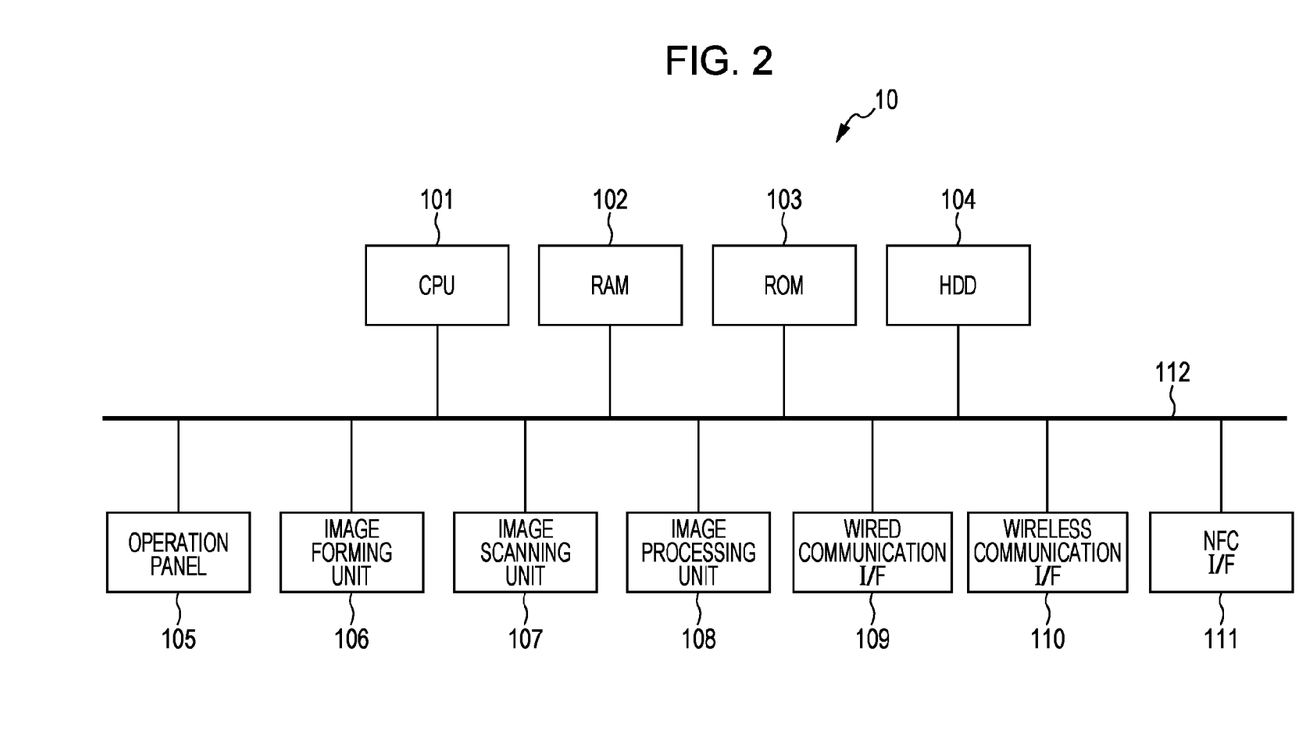
FIG. 2 illustrates an example of a hardware configuration of an image processing apparatus.

A hardware configuration of the image processing apparatus 10 will be described next. FIG. 2 illustrates an example of the hardware configuration of the image processing apparatus 10. As illustrated in FIG. 2, the image processing apparatus 10 includes a central processing unit (CPU) 101, a random access memory (RAM) 102, a read only memory (ROM) 103, a hard disk drive (HDD) 104, an operation panel 105, an image forming unit 106, an image scanning unit 107, an image processing unit 108, a wired communication interface (I/F) 109, a wireless communication I/F 110, and an NFC I/F 111, which are connected to a bus 112 and exchange data with one another via the bus 112.

The CPU 101 executes various kinds of software such as an operating system (OS) and applications. The RAM 102 is a memory that is used as, for example, a work memory of the CPU 101. The ROM 103 is a memory that stores, for example, various programs to be executed by the CPU 101. The CPU 101 loads the various programs stored in the ROM 103 or the like into the RAM 102 and executes the various programs so as to implement the functions of the image processing apparatus 10.

The HDD 104 is, for example, a magnetic disk device that stores image data or the like used in an image forming operation performed by the image forming unit 106.

The programs to be executed by the CPU 101 may be pre-stored in the ROM 103 or may be provided after being stored on a computer readable recording medium, such as a magnetic recording medium (such as a magnetic tape or a magnetic disk), an optical recording medium (such as an optical disc), a magneto-optical recording medium, or a semiconductor memory. Alternatively, the programs may be provided to the CPU 101 via the network 50, for example.

The operation panel 105 is a touch panel that displays various kinds of information and accepts an operation input from a user. The operation panel 105 includes a display that displays various kinds of information and a position detector sheet that detects a position touched with a finger or a stylus. Any detector, such as a detector that detects a touched position based on a pressure caused by the touch or based on a static electricity of an object that has touched, may be used to detect the touched position. In addition, a display and an input device such as a keyboard may be used in place of the touch panel.

The image forming unit 106 forms an image on a recording medium. The image forming unit 106 is, for example, a printer such as an electrophotograhic printer that transfers toner on a photoconductor onto a recording medium so as to form an image on the recording medium or an inkjet printer that ejects ink onto a recording medium so as to form an image on the recording medium.

The image scanning unit 107 scans an image on a recording medium and generates image data representing the image that has been scanned. The image scanning unit 107 is, for example, a scanner such as of a charge coupled device (CCD) system in which reflecting light of light that has been sequentially radiated onto an original from a light source is size-reduced by a lens and is received by a CCD sensor or of a contact image sensor (CIS) system in which reflecting light of light that has been radiated onto an original from a light-emitting diode (LED) light source is received by a CIS.

The image processing unit 108 performs various types of image processing, such as color correction and gradation correction, on image data input thereto. For example, the image processing unit 108 performs various types of image processing on image data obtained through a scan performed by the image scanning unit 107 or image data stored in the HDD 104, and outputs the resulting image data to the image forming unit 106.

The wired communication I/F 109 functions as a communication interface that enables transmission and reception of various kinds of data to and from the operation terminals 30 and the management server 40 via the network 50.

The wireless communication I/F 110 includes an antenna used to perform, for example, W-Fi Direct wireless communication with the mobile terminals 20 and functions as a communication interface that enables transmission and reception of various kinds of data to and from the mobile terminals 20.

The NFC I/F 111 includes an antenna used to perform NFC communication with the mobile terminals 20 and functions as a communication interface that enables transmission and reception of various kinds of data to and from the mobile terminals 20.

Figure 3:
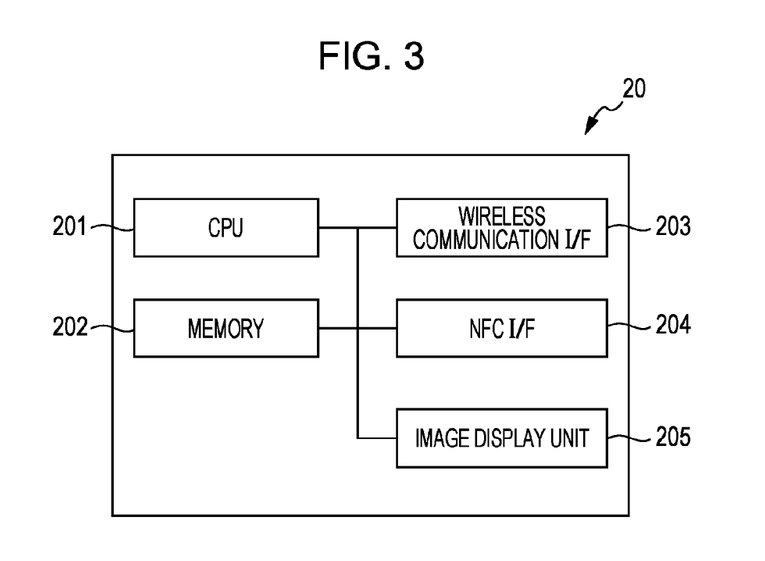
FIG. 3 illustrates an example of a hardware configuration of a mobile terminal.

FIG. 3 illustrates a hardware configuration of the mobile terminal 20.

As illustrated in FIG. 3, the mobile terminal 20 includes a CPU 201 and a memory 202. The CPU 201 executes various kinds of software, such as an OS and applications.

The memory 202 includes a storage area in which the various kinds of software, data used for execution of the various kinds of software, and so on are stored.

Programs to be executed by the CPU 201 may be pre-stored in the memory 202 or may be provided to the CPU 201 after being stored on a computer readable recording medium, such as a magnetic recording medium (such as a magnetic tape or a magnetic disk), an optical recording medium (such as an optical disc), a magneto-optical recording medium, or a semiconductor memory. In addition, the programs may be provided to the CPU 201 via the Internet, for example.

The mobile terminal 20 further includes a wireless communication I/F 203 and an NFC I/F 204 that enable wireless communication with an external device, and an image display unit 205 that displays an image.

The wireless communication I/F 203 includes an antenna used to perform, for example, Wi-Fi Direct wireless communication with the image processing apparatuses 10 and functions as a communication interface that enables transmission and reception of various kinds of data to and from the image processing apparatuses 10.

The NFC I/F 204 includes an antenna used to perform NFC communication with the image processing apparatuses 10 and functions as a communication interface that enables transmission and reception of various kinds of data to and from the image processing apparatuses 10.

The image display unit 205 is, for example, a touch panel. Accordingly, the image display unit 205 includes a liquid crystal panel and a position detector (not illustrated) that detects a position of the liquid crystal panel that is touched by an object such as a human finger or a stylus when the liquid crystal panel is touched by the object. The touch panel used in the present exemplary embodiment is not limited to any particular type and a touch panel of any given type such as a resistive film type or an electrostatic capacitive type may be used.

The mobile terminal 20 may include, for example, an HDD or a flash memory as a memory. An HDD or a flash memory stores data to be input to various kinds of software and data output from the various kinds of software, for example. The mobile terminal 20 may further include an input device, such as a keyboard or a mouse.

Figure 4:
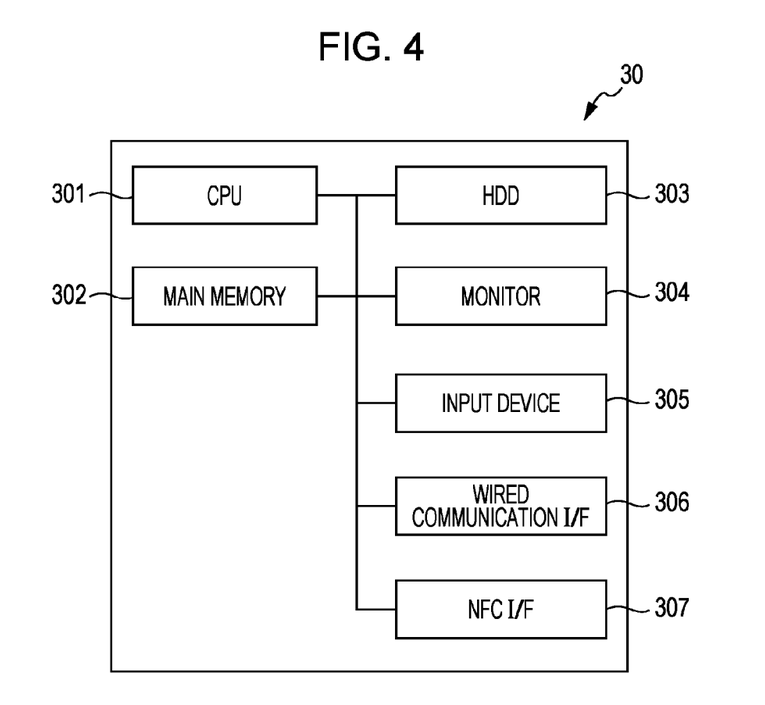
FIG. 4 illustrates an example of a hardware configuration of an operation terminal.

FIG. 4 illustrates a hardware configuration of the operation terminal 30.

As illustrated in FIG. 4, the operation terminal 30 includes a CPU 301 which is an arithmetic unit, a main memory 302, and an HDD 303. The CPU 301 executes various programs such as an OS and application software. The main memory 302 serves as a storage area that stores the various programs, data used to execute the various programs, and so on. The HDD 303 serves as a storage area that stores data to be input to the various programs, data output from the various programs, and so on. The operation terminal 30 further includes a monitor 304 that includes a video memory and a display and displays an image, and an input device 305 such as a keyboard or a mouse.

The operation terminal 30 further includes a wired communication I/F 306 and an NFC I/F 307.

The wired communication I/F 306 functions as a communication interface that enables transmission and reception of various kinds of data to and from the image processing apparatuses 10 and the management server 40 via the network 50.

The NFC I/F 307 includes an antenna used to perform NFC communication with the mobile terminals 20 and functions as a communication interface that enables transmission and reception of various kinds of data to and from the mobile terminals 20.

In the present exemplary embodiment, the operation terminal 30 also performs NFC communication with the mobile terminals 20 just like the image processing apparatuses 10.

In the above-described image processing system 1, the mobile terminals 20 and the operation terminals 30 transmit a print job to the image processing apparatus 10 via the network 50 or Wi-Fi Direct wireless communication. In this way, printing is performed by the image processing apparatus 10.

The management server 40 is capable of managing print jobs to be executed by the image processing apparatuses 10, rearranging the print jobs in an appropriate order, and transmitting the print jobs to the image processing apparatus 10. In this case, the management server 40 functions as a print server. The management server 40 is capable of managing files so as to allow the files to be shared among the mobile terminals 20 and the operation terminals 30. In this case, the management server 40 functions as a file server.

Functional Configuration of Image Processing Apparatus 10

A functional configuration of the image processing apparatus 10 will be described.

In the present exemplary embodiment, the image processing apparatus 10 performs push scanning or a process for pull scanning.

The term "push scanning" refers to a process in which the image processing apparatus 10 transmits via the network 50 image data generated by scanning a recording medium in accordance with a user operation to a folder provided in the operation terminal 30 as a folder specified in advance by the user.

The term "pull scanning" refers to a process in which the operation terminal 30 obtains image data that has been generated by the image processing apparatus 10 and is stored in a folder provided in the image processing apparatus 10 by accessing the folder provided in the image processing apparatus 10 via the network 50.

In the case of pull scanning and in the case of push scanning, it is necessary to make a folder that stores image data transmitted by the image processing apparatus 10 accessible to a computer apparatus connected to the network 50. Accordingly, a sharing setting, which is a setting allowing a folder to be accessed as a network folder from a computer apparatus other than the computer apparatus on which the folder resides, is set for the folder in which image data transmitted by the image processing apparatus 10 is stored.

In addition, in the case of push scanning and in the case of pull scanning, a user is required to specify by using the image processing apparatus 10 a storage location for generated image data in the related art, which decreases user convenience.

Accordingly, in the present exemplary embodiment, the image processing apparatus 10 performs NFC communication with the mobile terminal 20 and performs push scanning or a process for pull scanning in accordance with received information. During push scanning or the process for pull scanning, the image processing apparatus 10 transmits generated image data to a storage location without requiring the user to specify by using the image processing apparatus 10 the storage location.

A configuration of the image processing apparatus 10 for implementing this function will be described below.

Figure 5:
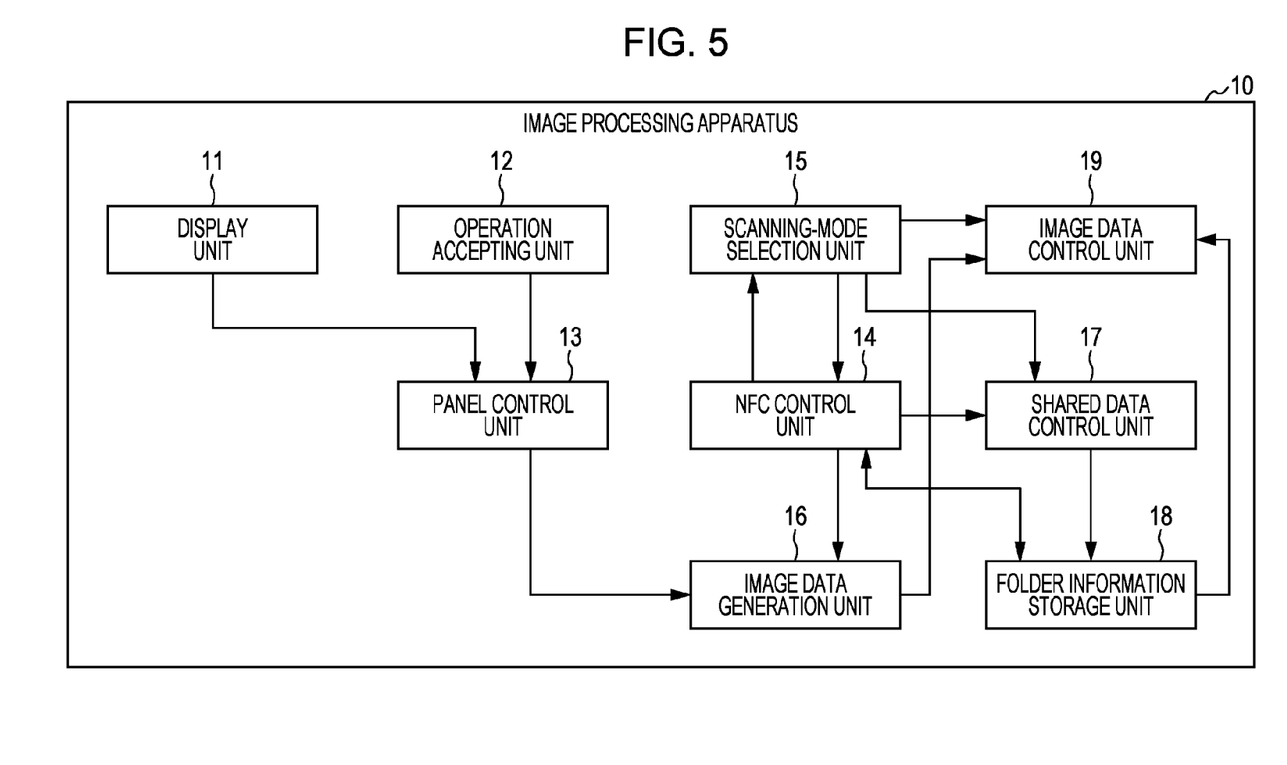
FIG. 5 is a block diagram illustrating an example of a functional configuration of the image processing apparatus.

FIG. 5 is a block diagram illustrating an example of a functional configuration of the image processing apparatus 10. The image processing apparatus 10 includes a display unit 11, an operation accepting unit 12, a panel control unit 13, an NFC control unit 14, a scanning-mode selection unit 15, an image data generation unit 16, a shared data control unit 17, a folder information storage unit 18, and an image data control unit 19.

Among these functional blocks, the display unit 11 and the operation accepting unit 12 are implemented by the operation panel 105. In addition, the panel control unit 13, the scanning-mode selection unit 15, the shared data control unit 17, and the image data control unit 19 are implemented as a result of the CPU 101 loading a program stored in the ROM 103 or the like into the RAM 102 and executing the program. Further, the NFC control unit 14 is implemented by the NFC I/F 111. In addition, the image data generation unit 16 and the folder information storage unit 18 are implemented by the image scanning unit 107 and the HDD 104, respectively.

The display unit 11 displays various images under control of the panel control unit 13. The operation accepting unit 12 accepts an operation performed by a user. The panel control unit 13 controls operations of the display unit 11 and the operation accepting unit 12.

The NFC control unit 14, which is an example of a communication unit, transmits and receives data via NFC communication. When a user places the mobile terminal 20 over the image processing apparatus 10, the NFC control unit 14 detects the mobile terminal 20 and performs NFC communication with the mobile terminal 20.

The scanning-mode selection unit 15, which is an example of a selection unit, selects either push scanning or a process for pull scanning performed by the image processing apparatus 10, based on information received from the mobile terminal 20 with which the NFC control unit 14 performs NFC communication. The image data generation unit 16 scans an image on a recording medium and generates image data which is an example of image information representing the image that has been scanned.

The shared data control unit 17, which is an example of a sharing setting unit, sets a sharing setting for a folder provided in the image processing apparatus 10 in the case where the scanning-mode selection unit 15 has selected to cause the image processing apparatus 10 to perform a process for pull scanning (or has selected pull scanning). Specifically, in the case where the scanning-mode selection unit 15 has selected pull scanning which is an example of a second choice, the shared data control unit 17 sets a sharing setting for a folder (hereinafter, referred to as a folder residing on the image processing apparatus 10) that is provided in the image processing apparatus 10 and that is specified in advance as a storage location for image data generated by the image data generation unit 16. That is, the shared data control unit 17 sets the folder residing on the image processing apparatus 10 as a network folder.

The shared data control unit 17 also generates path information (hereinafter, referred to as path information of the image processing apparatus 10) which is information indicating a location of this network folder (hereinafter, referred to as the network folder residing on the image processing apparatus 10) in the image processing apparatus 10 in which image data generated by the image data generation unit 16 is stored. The path information of the image processing apparatus 10 may be, for example, a uniform resource locator (URL) indicating the location of the network folder residing on the image processing apparatus 10.

The folder information storage unit 18 stores path information (described later) of the operation terminal 30 that is received by the NFC control unit 14 from the mobile terminal 20 and the path information of the image processing apparatus 10, which is an example of second identification information, generated by the shared data control unit 17.

The image data control unit 19, which is an example of a controller, transmits image data (hereinafter, referred to as image data produced by the image processing apparatus 10) generated by the image data generation unit 16 of the image processing apparatus 10 to the image processing apparatus 10 or the operation terminal 30, in accordance with the choice made by the scanning-mode selection unit 15. If the scanning-mode selection unit 15 has selected to cause the image processing apparatus 10 to perform push scanning (or has selected push scanning), the image data control unit 19 transmits image data to the operation terminal 30.

Specifically, in the case where the scanning-mode selection unit 15 has selected push scanning which is an example of a first choice, the image data control unit 19 refers to the path information of the operation terminal 30 stored in the folder information storage unit 18, and accesses a folder that is provided in the operation terminal 30, that is identified based on the path information of the operation terminal 30, and for which the sharing setting is set. The image data control unit 19 then transmits the image data produced by the image processing apparatus 10 to the folder that is provided in the operation terminal 30 and for which the sharing setting is set. In contrast, in the case where the scanning-mode selection unit 15 has selected pull scanning, the image data control unit 19 stores the image data in the network folder residing on the image processing apparatus 10. The network folder residing on the image processing apparatus 10 is an example of a second storage location.

Functional Configuration of Operation Terminal 30

A functional configuration of the operation terminal 30 will be described next.

Figure 6:
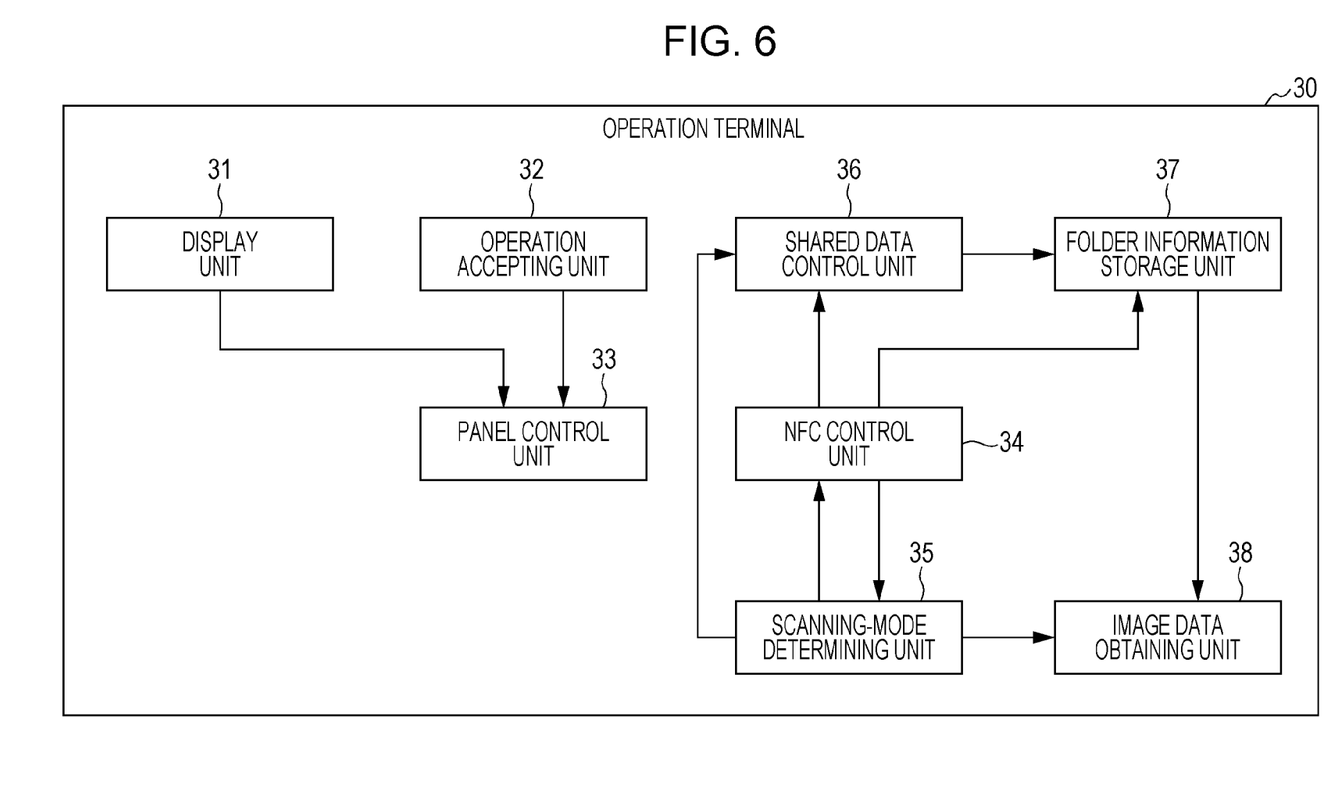
FIG. 6 is a block diagram illustrating an example of a functional configuration of the operation terminal.

FIG. 6 is a block diagram illustrating an example of a functional configuration of the operation terminal 30. The operation terminal 30 includes a display unit 31, an operation accepting unit 32, a panel control unit 33, an NFC control unit 34, a scanning-mode determining unit 35, a shared data control unit 36, a folder information storage unit 37, and an image data obtaining unit 38.

Among these functional blocks, the display unit 31 and the operation accepting unit 32 are implemented by the monitor 304 and the input device 305, respectively. In addition, the panel control unit 33, the scanning-mode determining unit 35, the shared data control unit 36, and the image data obtaining unit 38 are implemented by the CPU 301. Further, the NFC control unit 34 is implemented by the NFC I/F 307. In addition, the folder information storage unit 37 is implemented by the HDD 303.

The display unit 31, the operation accepting unit 32, and the panel control unit 33 have functions similar to those of the display unit 11, the operation accepting unit 12, and the panel control unit 13 (see FIG. 5) of the image processing apparatus 10, respectively.

The NFC control unit 34, which is an example of a communication unit, transmits and receives data via NFC communication. When a user places the mobile terminal 20 over the operation terminal 30, the NFC control unit 34 detects the mobile terminal 20 and performs NFC communication with the mobile terminal 20.

The scanning-mode determining unit 35, which is an example of a determining unit, determines whether the image processing apparatus 10 is to perform push scanning or has performed a process for pull scanning, in accordance with information received by the NFC control unit 34 from the mobile terminal 20.

The shared data control unit 36, which is an example of a sharing setting unit, sets a sharing setting for a folder provided in the operation terminal 30 in the case where the scanning-mode determining unit 35 has determined that the image processing apparatus 10 is to perform push scanning (or has determined that push scanning is to be performed). Specifically, if the scanning-mode determining unit 35 has determined that push scanning which is an example of a first determination is to be performed, the shared data control unit 36 sets a sharing setting for a folder (hereinafter, referred to as a folder residing on the operation terminal 30) that is provided in the operation terminal 30 and is specified in advance as a storage location for the image data produced by the image processing apparatus 10. That is, the shared data control unit 36 sets the folder residing on the operation terminal 30 in which the image data produced by the image processing apparatus 10 is to be stored as a network folder.

The shared data control unit 36 also generates path information (hereinafter, referred to as path information of the operation terminal 30) which is information indicating a location of this network folder (hereinafter, referred to as a network folder residing on the operation terminal 30) in the operation terminal 30 in which the image data produced by the image processing apparatus 10 is to be stored. The path information of the operation terminal 30 may be, for example, a URL indicating the location of the network folder residing on the operation terminal 30.

The folder information storage unit 37 stores the path information of the image processing apparatus 10 received by the NFC control unit 34 from the mobile terminal 20 and the path information of the operation terminal 30, which is an example of first identification information, generated by the shared data control unit 36.

The image data obtaining unit 38, which is an example of an obtaining unit, obtains the image data produced by the image processing apparatus 10 from the network folder residing on the image processing apparatus 10 in accordance with the determination that the scanning-mode determining unit 35 has made. Specifically, in the case where the scanning-mode determining unit 35 has determined that the image processing apparatus 10 has performed a process for pull scanning (or has determined that pull scanning has been performed), the image data obtaining unit 38 obtains the image data from the image processing apparatus 10.

Specifically, in the case where the scanning-mode determining unit 35 has determined that pull scanning, which is an example of a second determination, has been performed, the image data obtaining unit 38 refers to the path information of the image processing apparatus 10 stored in the folder information storage unit 37, and accesses the network folder residing on the image processing apparatus 10 identified based on the path information of the image processing apparatus 10. The image data obtaining unit 38 then obtains the image data produced by the image processing apparatus 10 stored in the network folder residing on the image processing apparatus 10.

In the case where the scanning-mode determining unit 35 has determined that push scanning is performed, the image data produced by the image processing apparatus 10 is stored in the network folder residing on the operation terminal 30. Accordingly, after push scanning has been performed, a user operates the operation terminal 30 and obtains the image data from the network folder residing on the operation terminal 30.

Flowchart of Operation of Image Processing Apparatus 10

An operation performed by the image processing apparatus 10 when performing pull scanning or push scanning will be described in detail below.

Figure 7:
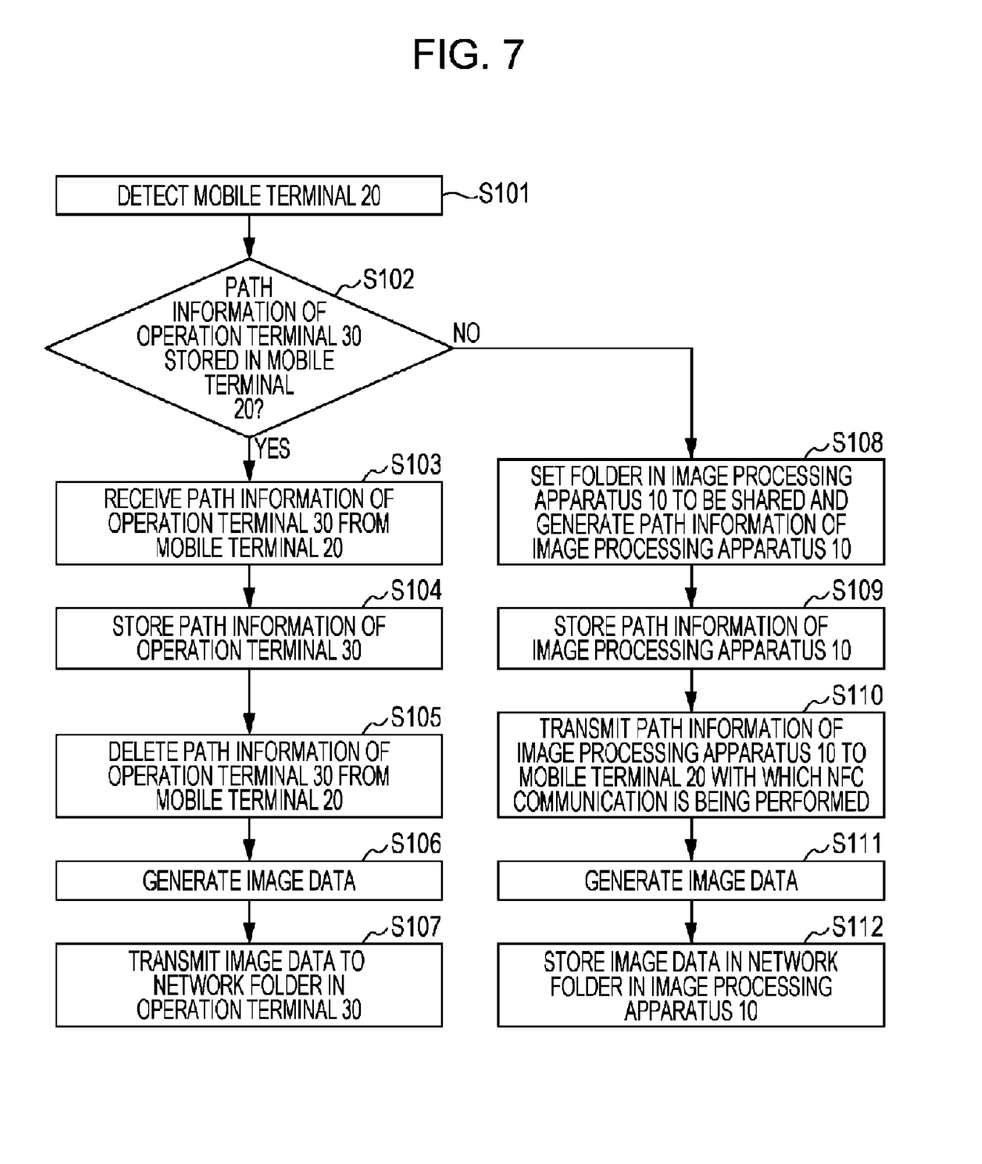
FIG. 7 is a flowchart illustrating an example of a procedure of a process performed by the image processing apparatus.

FIG. 7 is a flowchart illustrating a flow of the operation performed by the image processing apparatus 10 when performing pull scanning or push scanning.

When a user places the mobile terminal 20 over the image processing apparatus 10, the NFC control unit 14 of the image processing apparatus 10 detects the mobile terminal 20 (step S101). The NFC control unit 14 then performs NFC communication with the mobile terminal 20. The scanning-mode selection unit 15 determines whether or not the path information of the operation terminal 30 is stored in the mobile terminal 20 (step S102).

If the path information of the operation terminal 30 is stored in the mobile terminal 20 with which the NFC control unit 14 is performing NFC communication (YES in step S102), the scanning-mode selection unit 15 selects push scanning. In the case where the scanning-mode selection unit 15 selects push scanning, the operation terminal 30 has performed preprocessing (described later) for push scanning before the mobile terminal 20 is detected by the NFC control unit 14.

If the scanning-mode selection unit 15 has selected push scanning, the NFC control unit 14 that is performing NFC communication with the mobile terminal 20 receives the path information of the operation terminal 30 from the mobile terminal 20 (step S103). Then, the folder information storage unit 18 stores the path information of the operation terminal 30 that has been received by the NFC control unit 14 (step S104). The NFC control unit 14 then deletes the path information of the operation terminal 30 that is stored in the mobile terminal 20 (step S105).

Subsequently, the image data generation unit 16 starts scanning a recording medium and generates image data (step S106). The image data control unit 19 then refers to the path information of the operation terminal 30 stored in the folder information storage unit 18, and accesses the network folder residing on the operation terminal 30 which is identified based on the path information of the operation terminal 30. The image data control unit 19 then transmits the image data produced by the image processing apparatus 10 to the network folder residing on the operation terminal 30 (step S107).

The operation performed by the image processing apparatus 10 when performing push scanning then ends.

If the path information of the operation terminal 30 is not stored in the mobile terminal 20 with which the NFC control unit 14 is performing NFC communication (NO in step S102), the scanning-mode selection unit 15 selects pull scanning. In this case, the shared data control unit 17 sets a folder residing on the image processing apparatus 10 to be shared as a network folder and generates the path information of the image processing apparatus 10 (step S108).

Subsequently, the folder information storage unit 18 stores the path information of the image processing apparatus 10 that has been generated by the shared data control unit 17 (step S109). Then, the NFC control unit 14 transmits the path information of the image processing apparatus 10 that is stored in the folder information storage unit 18 to the mobile terminal 20 with which NFC communication is being performed (step S110). In this way, the path information of the image processing apparatus 10 is stored in the mobile terminal 20.

Then, the image data generation unit 16 scans a recording medium and generates image data (step S111). In the case where the scanning-mode selection unit 15 has selected pull scanning, the folder information storage unit 18 does not store the path information of the operation terminal 30. In this case, the image data control unit 19 stores the image data produced by the image processing apparatus 10 in the network folder residing on the image processing apparatus 10 (step S112).

The operation performed by the image processing apparatus 10 when performing pull scanning then ends.

Flowchart of Operation of Operation Terminal 30

An operation performed by the operation terminal 30 when performing NFC communication with the mobile terminal 20 will be described in detail.

Figure 8:
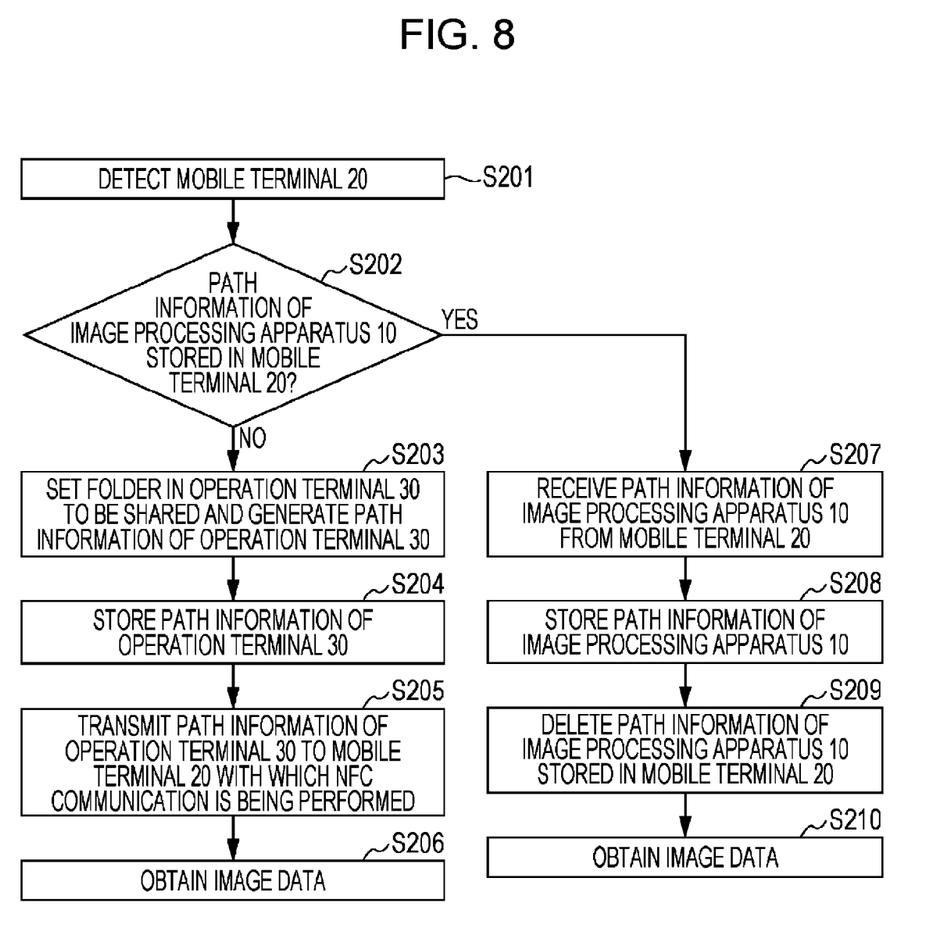
FIG. 8 is a flowchart illustrating an example of a procedure of a process performed by the operation terminal.

FIG. 8 is a flowchart illustrating a flow of the operation performed by the operation terminal 30 when performing NFC communication with the mobile terminal 20.

When a user places the mobile terminal 20 over the operation terminal 30, the NFC control unit 34 of the operation terminal 30 detects the mobile terminal 20 (step S201). The NFC control unit 34 then performs NFC communication with the mobile terminal 20. The scanning-mode determining unit 35 determines whether or not the path information of the image processing apparatus 10 is stored in the mobile terminal 20 (step S202).

If the path information of the image processing apparatus 10 is not stored in the mobile terminal 20 with which the NFC control unit 34 is performing NFC communication (NO in step S202), the scanning-mode determining unit 35 determines that push scanning is to be performed. In this case, the operation terminal 30 performs preprocessing for push scanning.

As the preprocessing for push scanning, the shared data control unit 36 sets a folder residing on the operation terminal 30 to be shared as a network folder and generates path information of the operation terminal 30 (step S203). Then, the folder information storage unit 37 stores the path information of the operation terminal 30 that has been generated by the shared data control unit 36 (step S204). The NFC control unit 34 then transmits the path information of the operation terminal 30 that is stored in the folder information storage unit 37 to the mobile terminal 20 with which NFC communication is being performed (step S205). In this way, the path information of the operation terminal 30 is stored in the mobile terminal 20.

In this way, the preprocessing for push scanning performed by the operation terminal 30 is completed.

Thereafter, when a user places the mobile terminal 20 over the image processing apparatus 10, the image processing apparatus 10 performs push scanning, that is, the process of steps S101 to S107. As a result, the image data produced by the image processing apparatus 10 is transmitted to the network folder residing on the operation terminal 30. Accordingly, a user operates the operation terminal 30 and obtains the image data from the network folder residing on the operation terminal 30 (step S206). As described above, in push scanning, the operation terminal 30 obtains the image data produced by the image processing apparatus 10 without accessing the image processing apparatus 10.

If the path information of the image processing apparatus 10 is stored in the mobile terminal 20 with which the NFC control unit 34 is performing NFC communication (YES in step S202), the scanning-mode determining unit 35 determines that a process for pull scanning has been performed. In the case where the scanning-mode determining unit 35 determines that a process for pull scanning has been performed, the image processing apparatus 10 has already performed the process for pull scanning, that is, the process of steps S101 to S102 and S108 to S112.

If the scanning-mode determining unit 35 determines that pull scanning has been performed, the NFC control unit 34 that is performing NFC communication with the mobile terminal 20 receives the path information of the image processing apparatus 10 from the mobile terminal 20 (step S207). The folder information storage unit 37 then stores the path information of the image processing apparatus 10 that has been received by the NFC control unit 34 (step S208). The NFC control unit 34 then deletes the path information of the image processing apparatus 10 stored in the mobile terminal 20 (step S209).

Thereafter, the image data obtaining unit 38 refers to the path information of the image processing apparatus 10 stored in the folder information storage unit 37, and accesses the network folder residing on the image processing apparatus 10. The image data obtaining unit 38 then obtains the image data stored in the network folder residing on the image processing apparatus 10 (step S210). As described above, in pull scanning, the operation terminal 30 obtains the image data produced by the image processing apparatus 10 by accessing the image processing apparatus 10.

The operation performed by the operation terminal 30 when performing NFC communication with the mobile terminal 20 then ends.

According to this exemplary embodiment, in the case of push scanning, the image data control unit 19 refers to the path information of the operation terminal 30 stored in the folder information storage unit 18 and accesses the network folder residing on the operation terminal 30. The image data control unit 19 then transmits the image data to the network folder residing on the operation terminal 30. In contrast, in the case of pull scanning, the image data control unit 19 stores the image data in the network folder residing on the image processing apparatus 10.

As described above, a storage location indicated by the path information of the operation terminal 30 that has been received in advance by the image processing apparatus 10 from the mobile terminal 20 is set as the destination to which the image data produced by the image processing apparatus 10 is to be transmitted.

In the case of pull scanning, the image data obtaining unit 38 of the operation terminal 30 refers to the path information of the image processing apparatus 10 stored in the folder information storage unit 37, and accesses the network folder residing on the image processing apparatus 10. The image data obtaining unit 38 then obtains the image data stored in the network folder residing on the image processing apparatus 10.

Accordingly, even if the image processing apparatus 10 does not receive the path information of the operation terminal 30 from the mobile terminal 20 in advance, a predetermined storage location is set as a destination to which the image data produced by the image processing apparatus 10 is to be transmitted.

Note that the operation terminal 30 may obtain the image data produced by the image processing apparatus 10, by using an application installed in the operation terminal 30 when obtaining the image data in the present exemplary embodiment.

In addition, a password-based access authentication step may be further provided when a computer apparatus attempts to access the network folder residing on the image processing apparatus 10 in the case where the scanning-mode selection unit 15 of the image processing apparatus 10 has selected pull scanning in the present exemplary embodiment. That is, when a computer apparatus attempts to access the network folder residing on the image processing apparatus 10, the image processing apparatus 10 may request input of an access password. In this case, the shared data control unit 17 sets the authentication step based a password (hereinafter, referred to as a password for the image processing apparatus 10) used to access the network folder residing on the image processing apparatus 10. The authentication step based on the password for the image processing apparatus 10 is set by the shared data control unit 17 when the shared data control unit 17 sets the network folder residing on the image processing apparatus 10 and generates the pass information of the image processing apparatus 10. At this time, the shared data control unit 17 also generates password information of the image processing apparatus 10 which is information used for authentication based on the password for the image processing apparatus 10.

The folder information storage unit 18 stores the password information of the image processing apparatus 10 that has been generated by the shared data control unit 17 together with the path information of the image processing apparatus 10. The NFC control unit 14 transmits the password information of the image processing apparatus 10 stored in the folder information storage unit 18 to the mobile terminal 20 together with the path information of the image processing apparatus 10 when performing NFC communication with the mobile terminal 20. Then, the NFC control unit 34 of the operation terminal 30 performs NFC communication with the mobile terminal 20 and receives the path information of the image processing apparatus 10 and the password information of the image processing apparatus 10. The folder information storage unit 37 stores the path information of the image processing apparatus 10 and the password information of the image processing apparatus 10 that have been received by the NFC control unit 34.

Then, the image data obtaining unit 38 of the operation terminal 30 refers to the path information of the image processing apparatus 10 stored in the folder information storage unit 37 and makes a request to access the network folder residing on the image processing apparatus 10. Then, the image data obtaining unit 38 inputs the password information of the image processing apparatus 10 stored in the folder information storage unit 37. The shared data control unit 17 of the image processing apparatus 10 compares the password input by the operation terminal 30 with the password for the image processing apparatus 10 stored in the folder information storage unit 18. If the passwords match, the shared data control unit 17 authorizes the operation terminal 30 to access the network folder residing on the image processing apparatus 10. The image data obtaining unit 38 of the operation terminal 30 that has been authorized to access the network folder residing on the image processing apparatus 10 obtains the image data stored in the network folder residing on the image processing apparatus 10.

In the case where the scanning-mode selection unit 15 has selected pull scanning, the image processing apparatus 10 may disable the sharing setting of the network folder residing on the image processing apparatus 10 after the image data obtaining unit 38 of the operation terminal 30 has obtained the image data from the network folder residing on the image processing apparatus 10. In such a case, the shared data control unit 17 disables the sharing setting of the network folder residing on the image processing apparatus 10.

The path information of the image processing apparatus 10 that is generated by the shared data control unit 17 may be constituted by a random character string.

In the present exemplary embodiment, a password-based access authentication step may be further provided when a computer apparatus attempts to access the network folder residing on the operation terminal 30 in the case where the scanning-mode determining unit 35 of the operation terminal 30 has determined that push scanning is to be performed. That is, when a computer apparatus attempts to access the network folder residing on the operation terminal 30, the operation terminal 30 may request input of an access password. In this case, the shared data control unit 36 sets the authentication step based on a password (hereinafter, referred to as a password for the operation terminal 30) used to access the network folder residing on the operation terminal 30. The authentication step based on the password for the operation terminal 30 is set by the shared data control unit 36 when the shared data control unit 36 sets the network folder residing on the operation terminal 30 and generates the path information of the operation terminal 30. At this time, the shared data control unit 36 also generates password information of the operation terminal 30 which is information used for authentication based on the password for the operation terminal 30.

The folder information storage unit 37 stores the password information of the operation terminal 30 that has been generated by the shared data control unit 36 together with the path information of the operation terminal 30. In addition, the NFC control unit 34 transmits the password information of the operation terminal 30 stored in the folder information storage unit 37 to the mobile terminal 20 together with the path information of the operation terminal 30 when performing NFC communication with the mobile terminal 20. Thereafter, the NFC control unit 14 of the image processing apparatus 10 performs NFC communication with the mobile terminal 20, and receives the path information of the operation terminal 30 and the password information of the operation terminal 30. The folder information storage unit 18 stores the path information of the operation terminal 30 and the password information of the operation terminal 30 that have been received by the NFC control unit 14.

The image data control unit 19 of the image processing apparatus 10 refers to the path information of the operation terminal 30 stored in the folder information storage unit 18 and makes a request to access the network folder residing on the operation terminal 30. Then, the image processing apparatus 10 inputs the password information of the operation terminal 30 stored in the folder information storage unit 18. The shared data control unit 36 of the operation terminal 30 compares the password input by the image processing apparatus 10 with the password of the operation terminal 30 stored in the folder information storage unit 37. If the passwords match, the shared data control unit 36 authorizes access to the network folder residing on the operation terminal 30. The image data control unit 19 of the image processing apparatus 10 whose request to access the network folder residing on the operation terminal 30 has been authorized transmits the image data to the network folder residing on the operation terminal 30. Then, the user operates the operation terminal 30 and accesses the network folder residing on the operation terminal 30 to obtain the image data.

In the case where the scanning-mode determining unit 35 has determined that push scanning is to be performed, the operation terminal 30 may disable the sharing setting of the network folder residing on the operation terminal 30 after the image processing apparatus 10 has transmitted the image data to the network folder residing on the operation terminal 30. In such a case, the shared data control unit 36 disables the sharing setting of the network folder residing on the operation terminal 30.

The path information of the operation terminal 30 that is generated by the shared data control unit 36 may be constituted by a random character string.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a processor configured to execute:
   a communication unit configured to receive data via wireless communication from a terminal;
   a determination unit configured to determine whether a first mode or a second mode is performed based on whether the data received by the communication unit identifies a location to store image information,
   wherein the determination unit is configured to determine the first mode in response to the data received by the communication unit identifying the location to store the image information, the location being a first storage location in another apparatus identified by a first identification information, and
   wherein the determination unit is configured to determine the second mode in response to the data received by the communication unit not identifying any location to store the image information; and
   a controller configured to transmit, in case of the first mode, the image information to the first storage location identified by the first identification information; and configured to store, in case of the second mode, the image information in a second storage location for the image information in the image processing apparatus.

2. The image processing apparatus according to claim 1, wherein the processor is further configured to execute:
   a selection unit configured to select a first choice in a case where the communication unit has received the first identification information from the terminal and select a second choice in a case where the communication unit does not receive the first identification information from the terminal, wherein
   the controller configured to transmit the image information to the first storage location indicated by the first identification information in a case where the selection unit has selected the first choice and store the image information in a second storage location for the image information in the image processing apparatus in a case where the selection unit has selected the second choice.

3. The image processing apparatus according to claim 2, wherein the communication unit configured to transmit second identification information to the terminal in a case where the selection unit has selected the second choice, the second identification information indicating the second storage location for the image information in the image processing apparatus.

4. The image processing apparatus according to claim 3, wherein the processor is further configured to execute:
   a sharing setting unit configured to generate access information which is information used by the other apparatus to access the second storage location for the image information in the image processing apparatus, wherein
   the communication unit further configured to transmit the access information to the terminal.

5. The image processing apparatus according to claim 4, wherein the sharing setting unit configured to set the second storage location for the image information in the image processing apparatus not to be accessed by the other apparatus after the other apparatus has obtained the image information by accessing the second storage location for the image information in the image processing apparatus.

6. A communication apparatus comprising:
   a processor configured to execute:
   a communication unit configured to receive data via wireless communication from a terminal;
   a determination unit configured to determine whether a first mode or a second mode is performed based on whether the data received by the communication unit identifies a location storing image information,
   wherein the determination unit is configured to determine the first mode in response to the data received by the communication unit not identifying any location storing the image information, and the determination unit is configured to determine the second mode in response to the data received by the communication unit identifying the location storing the image information, the location being a first storage location in an image processing apparatus identified by a first identification information; and
   an obtaining unit configured to obtain, in case of the second mode, the image information from the first storage location identified by the first identification information,
   wherein, in case of the first mode, the communication unit configured to transmit second identification information to the terminal, the second identification information indicating a second storage location of the image information in the communication apparatus.

7. An image processing system comprising:
   an image processing apparatus configured to scan an image on an original and generates image information which is information representing the image that has been scanned; and
   a terminal configured to perform wireless communication with the image processing apparatus, wherein
   the image processing apparatus includes
   a processor configured to execute:
   a communication unit configured to receive data via wireless communication from the terminal,
   a determination unit configured to determine whether a first mode or a second mode is performed based on whether the data received by the communication unit identifies a location to store the image information, wherein the determination unit is configured to determine the first mode in response to the data received by the communication unit identifying the location to store the image information, the location being a first storage location in another apparatus identified by a first identification information, and wherein the determination unit is configured to determine the second mode in response to the data received by the communication unit not identifying any location to store the image information; and a controller configured to transmit, in case of the first mode, the image information to the first storage location identified by the first identification information; and configured store, in case of the second mode, the image information in a second storage location for the image information in the image processing apparatus.

8. An image processing method comprising:

receiving data via wireless communication from a terminal;

determining whether a first mode or a second mode is performed based on whether the data received from the terminal identities a location to store image information, the first mode being determined in response to the data received from the terminal identifying the location to store the image information, the location being a storage location in another apparatus identified by a first identification information, and the second mode being determined in response to the data received from the terminal not identifying any location to store the image information;

transmitting, in case of the first mode, the image information to the first storage location identified by the first identification information; and storing, in case of the second mode, the image information in a second storage location in an apparatus where the image processing method is performed.

* * * * *